(12) United States Patent
Chappas (10) Patent No.: US 6,933,509 B1
(45) Date of Patent: *Aug. 23, 2005

(54) APPARATUS AND METHOD USING FRACTIONATED IRRADIATION TO HARDEN METAL

(75) Inventor: Walter J. Chappas, Rockville, MD (US)

(73) Assignee: Allasso Industries, Inc., Montgomery, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/237,829

(22) Filed: Sep. 9, 2002

Related U.S. Application Data (60) Provisional application No. 60/318,779, filed on Sep. 11, 2001.

(51) Int. Cl.[7] .......................... C22C 37/00; B23K 26/00
(52) U.S. Cl. .................................... 250/492.1; 148/121
(58) Field of Search ......................... 250/492.1, 492.3, 250/494.1, 453.11, 453.1, 492.2; 148/4, 152, 148/3, 121; 178/3, 4, 52

(56) References Cited

U.S. PATENT DOCUMENTS

| | | | | |
|---|---|---|---|---|
| 3,915,757 | A | * 10/1975 | Engel ......................... | 148/278 |
| 4,486,240 | A | * 12/1984 | Sciaky ........................ | 148/565 |
| 4,829,550 | A | * 5/1989 | Sanderson .................... | 378/59 |
| 5,888,619 | A | 3/1999 | Griffin ......................... | 428/172 |
| 5,915,162 | A | 6/1999 | Uchino et al. ............... | 428/551 |
| 5,918,103 | A | 6/1999 | Kobayashi et al. ........... | 419/18 |
| 5,955,186 | A | 9/1999 | Grab ......................... | 428/312.8 |
| 5,961,751 | A | * 10/1999 | Maruki et al. .............. | 148/512 |
| 5,961,861 | A | * 10/1999 | McCay et al. ......... | 219/121.83 |
| 5,966,585 | A | 10/1999 | Sue ............................. | 428/555 |
| 5,993,506 | A | 11/1999 | Kobayashi et al. ........... | 75/240 |

(Continued)

OTHER PUBLICATIONS

U.S. Appl. No. 10/237,830, filed Sep. 2002, Chappas.*
"Improvement of Composite Coatings by Electron Beam Processing" Vadim Jabotinski, Small Business Innovative Research Proposal, Jun. 2000.*
Electron Beam Modification of Nanostructured Materials; Vadim J. Jabotinski and Francis H. (Sam) Froes.
The Processing and Synthesis of Materials by Electron Beams. J. Jabotinski.
Improvement of Composite Coatings by Electron Beam Processing; Vadim J. Jabotinski.

*Primary Examiner*—Frank G. Font
*Assistant Examiner*—Christopher M. Kalivoda
(74) *Attorney, Agent, or Firm*—Waddey & Patterson, P.C.; Phillip E. Walker; Lucian Wayne Beavers (57) ABSTRACT

The present invention provides an apparatus for hardening a metal article, comprising a holding device, an energy beam generator pointed at the holding device for directing energy beams at the holding device, and a cycling system supporting the holding device, wherein the cycling system varies the location of the holding device relative to the energy beam generator. The apparatus includes an energy beam delivery instrument system positioned between the energy beam generator and the holding device so that the energy an energy beam delivery instrument directs the energy beam to the holding device. Also, the apparatus includes an auxiliary heating device engaging the holding device, wherein the auxiliary heating device heats the metal article independently from the energy beam.

30 Claims, 11 Drawing Sheets

U.S. PATENT DOCUMENTS

| | | | |
|---|---|---|---|
| 6,004,189 A | 12/1999 | Phillips | 451/49 |
| 6,033,791 A | 3/2000 | Smith et al. | 428/627 |
| 6,087,025 A | 7/2000 | Dearnaley et al. | 428/623 |
| 6,102,140 A | 8/2000 | Boyce et al. | 175/374 |
| 6,140,262 A | 10/2000 | Collier et al. | 501/96.4 |
| 6,429,444 B1 * | 8/2002 | Korenev et al. | 250/492.3 |
| 6,543,424 B1 * | 4/2003 | Yamaguchi et al. | 123/495 |
| 6,761,851 B1 * | 7/2004 | Chappas | 266/107 |

* cited by examiner

PRIOR ART

APPARATUS AND METHOD USING FRACTIONATED IRRADIATION TO HARDEN METAL

CLAIM FOR PRIORITY

This patent application claims priority to U.S. Patent Provisional Application Ser. No. 60/318,779, filed Sep. 11, 2001, the contents of which are expressly incorporated herein by reference.

BACKGROUND OF THE INVENTION

The present invention relates generally to an apparatus and method for hardening metal using irradiation and alternate heating.

DESCRIPTION OF THE PRIOR ART

The effects of radiation on metals, especially from nuclear reactors, have been studied and reported for many years. Most of these studies have focused on the effects of nuclear radiation on nuclear reactor pressure vessels and other metal components in and around the core of a nuclear power plant. However, almost all of the previous work on the effects of nuclear radiation on metal focused on the deleterious changes induced in the metal, particularly the embrittling effect of nuclear radiation on metal.

Less abundant in the prior reports is the effect of electron radiation on metals. For example, a study by M. J. Mankin, A. T. Churchman, D. R. Harries, and R. E. Smallman showed that high doses of electron radiation can affect specific structural properties of metal, such as critical shear stress. However, the focus of this study was also on the deleterious effects of the radiation on the metal.

Figure 2:
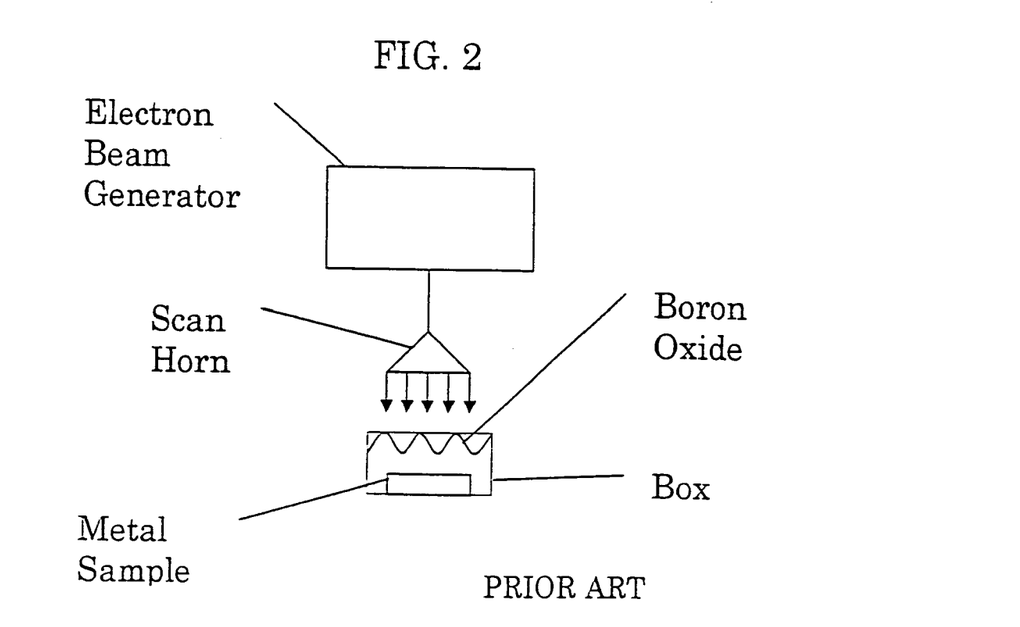
FIG. 2 is an illustration of the prior art lacking the auxiliary heating device, insulation, and the x-ray converter.

Data on the useful application of radiation is nearly non-existent. Recent publications by V. J. Jabotinski described the useful application of high-dose electron beam radiation on tungsten carbide and other hard metals. As seen in FIG. 2, Jabotinski used an electron beam generator to both irradiate and heat the metal.

Jabotinski's process called for the electron beam treatment of the metal sample with 1.4 MeV electrons. The metal samples were kept in the air under a melting medium or "gate". In his experiments, Jabotinski exclusively used electron beams to both radiate and heat metal in a liquid gate. As such, Jabotinski failed to use auxiliary heating to efficiently and effectively maintain conditions conducive to the facilitation of the morphological changes in the metal.

Jabotinski failed to produce a useful commercial product because the yield is low and is uneconomical for most industrial applications. For example, Jabotinski's work used 1.4 MeV electrons that are largely stopped in the gate material and, as a result, never reach the metal sample. Most of the electron radiation failed to reach the sample because normally 1.4 MeV electrons penetrate to only an approximate depth of only 2.6 mm in a typical oxide gate with a density of 2.7 g/cc. As a result, almost no electron radiation reached the metal sample and the limited amount that does only penetrated to a depth of less than a micron into the surface of the metal sample.

Other minute amounts of radiation from the electron beam may reach the metal sample. It is well known in the art that an energy beam creates x-rays when the energy beam strikes a solid object and releases photons. Since the electron beams in Jabotinsi's work are stopped in the oxide gate, less than one tenth of one percent of the electron radiation could be converted into x-rays, which could penetrate the melted oxide gate and reach the metal sample. This percentage is extreme low and practically insignificant in the irradiation of the metal.

Another draw back to Jabotinski's work is the lack of an alternative heating source. Jabotinski exclusively used the electron radiation deposited into the gate material to heat the gate and the metal sample. This is an extremely expensive technique for heating. Also, Jabotinski's work only described a process where the heating and irradiation are performed simultaneously by the radiation. As a result, Jabotinski's work lacks efficiency and is uneconomical for most industrial applications.

Thus, there is a need for an apparatus and method that effectively, economically, and efficiently hardens metal through irradiation.

SUMMARY OF THE INVENTION

The present invention provides an apparatus for hardening a metal article, comprising a holding device, an energy beam generator pointed at the holding device for directing energy beams at the holding device, and an auxiliary heating device engaging the holding device, wherein the auxiliary heating device heats the metal article independently from the energy beam. The apparatus includes an energy beam delivery instrument system positioned between the energy beam generator and the holding device so that the energy an energy beam delivery instrument directs the energy beam to the holding device. Also, the apparatus also includes a transport system supporting the holding device, wherein the transport system varies the location of the holding device relative to the energy beam generator.

A method for hardening metal is also disclosed. This method includes irradiating the metal and heating the metal independently from the irradiation. The method teaches separating the metal from the atmosphere using a fluid material, irradiating the metal in intervals, cycling the metal through the irradiation, and converting an energy beam into x-rays.

A main purpose of this invention is to effectively, economically, and efficiently harden metal by irradiating the metal article with an energy beam. This purpose requires heating and irradiating the metal sample with predetermined amounts of irradiation at a predetermined temperature to foster the metallurgical changes within the metal sample.

Irradiation of the metal samples causes a reduction in the porosity of the metal surface. Also, the irradiation creates a monolithic surface structure where the components of the metal sample, tungsten carbide and a cobalt binder, are converted into new phases. These two phenomenons facilitate increase in the wear characteristic of the metal sample.

It is therefore a general objective of the present invention to provide an apparatus for hardening metal using irradiation.

Another objective of the present invention is to provide an apparatus for hardening metal using irradiation and heat independent from the irradiation.

Still another objective of this invention is to harden metal by purposefully converting an energy beam into x-rays in order to increase the amount of radiation reaching the metal.

Yet another objective of the present invention is the use of gamma rays to harden metal.

Another object of the present invention is to reduce the amount of irradiation needed to harden metal by using higher energy irradiation.

Still yet another objective of the present invention is to harden tungsten carbide through irradiation.

Still another objective of the present invention is to harden metal through the application of irradiation to the metal while the metal cycles in and out of the irradiation.

Yet another objective of the present invention is the disclosure of methods for hardening metal by irradiating the metal and heating the metal independently from the irradiation.

Still yet another objective of the present invention is the disclosure of methods for hardening metal by irradiating the metal and transporting the metal through the irradiation.

Numerous other objects, features and advantages of the present invention will be readily apparent to those skilled in the art, upon the reading of the following disclosure, when taken in conjunction with the new drawings.

BRIEF DESCRIPTION OF THE DRAWINGS

FIG. 4 is similar to FIG. 3 except FIG. 4 shows a sealed area surrounding the holding device to separate the holding device from the atmosphere

FIG. 7 shows one embodiment of the energy beam delivery instrument redirecting the energy beam to engage multiple metal samples.

FIG. 10D is similar to FIGS. 10A–10C and shows the transport system relocating the energy beam to engage multiple metal samples. FIG. 10D shows the energy beam generator transitioning from one metal sample to another.

FIG. 11A shows an embodiment of the transport system varying the location of the holding device and the metal with respect to the energy beam. FIG. 11A starts with a holding device and metal sample positioned to engage the energy beam.

FIG. 12A shows the metal sample generally perpendicular to the energy beam.

DETAILED DESCRIPTION OF THE PREFERRED EMBODIMENTS

Figure 1:
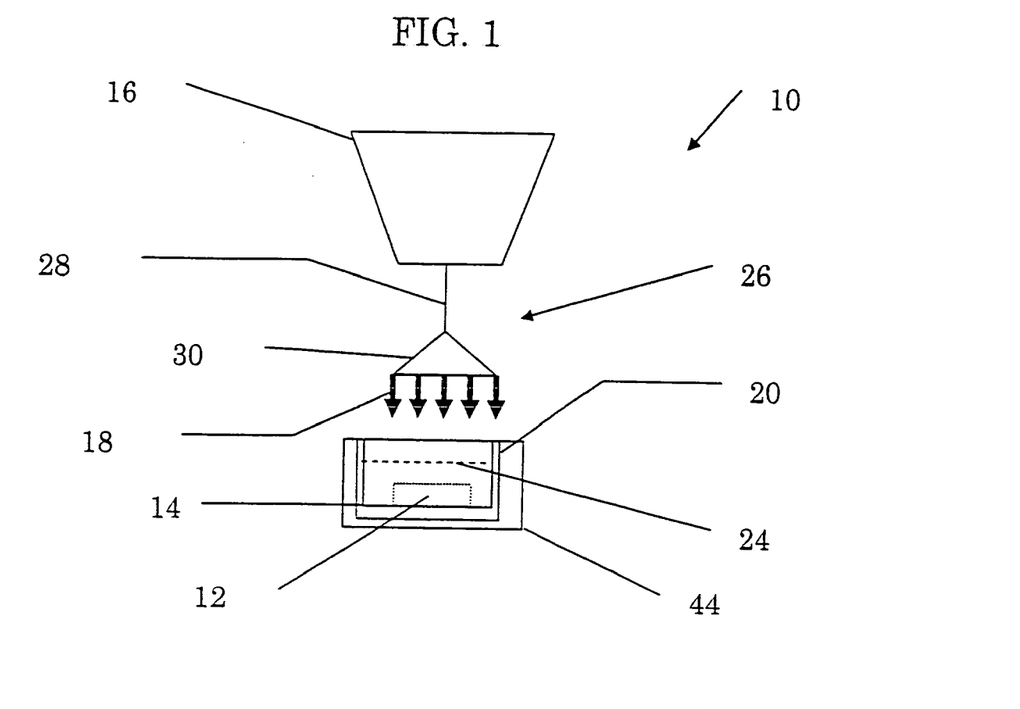
FIG. 1 shows a preferred embodiment of the apparatus including the energy beam generator, the holding device, and the auxiliary heating device engaging the holding device.

Referring now to FIG. 1, the apparatus of the present invention is shown and is generally designated by the numeral 10. The apparatus 10 is an apparatus for hardening a metal article 12, or metal sample 12, and comprises a holding device 14, an energy beam generator 16 pointing at the holding device 14 so that the energy beam generator 16 directs an energy beam 18 at the holding device 14. The apparatus 10 also includes an auxiliary heating device 20 engaging the holding device 14, wherein the auxiliary heating device 20 heats the metal article 12 independently from the energy beam 18.

Figure 3:
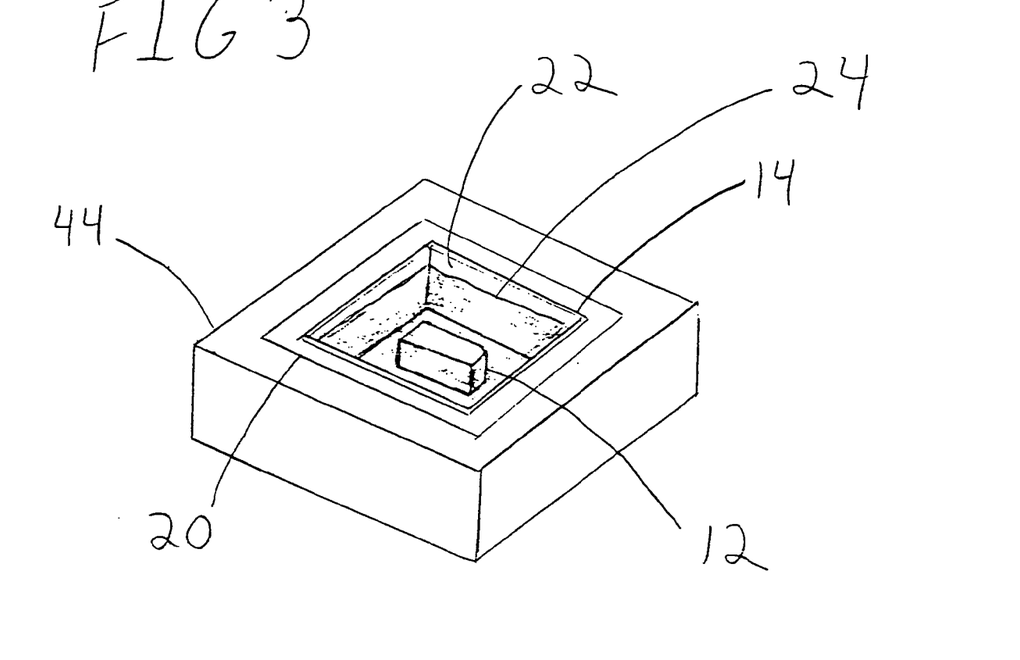
FIG. 3 shows a detail perspective view of the container holding a metal sample in the fluid material and surrounded by one embodiment of the auxiliary heating device.
Figure 4:
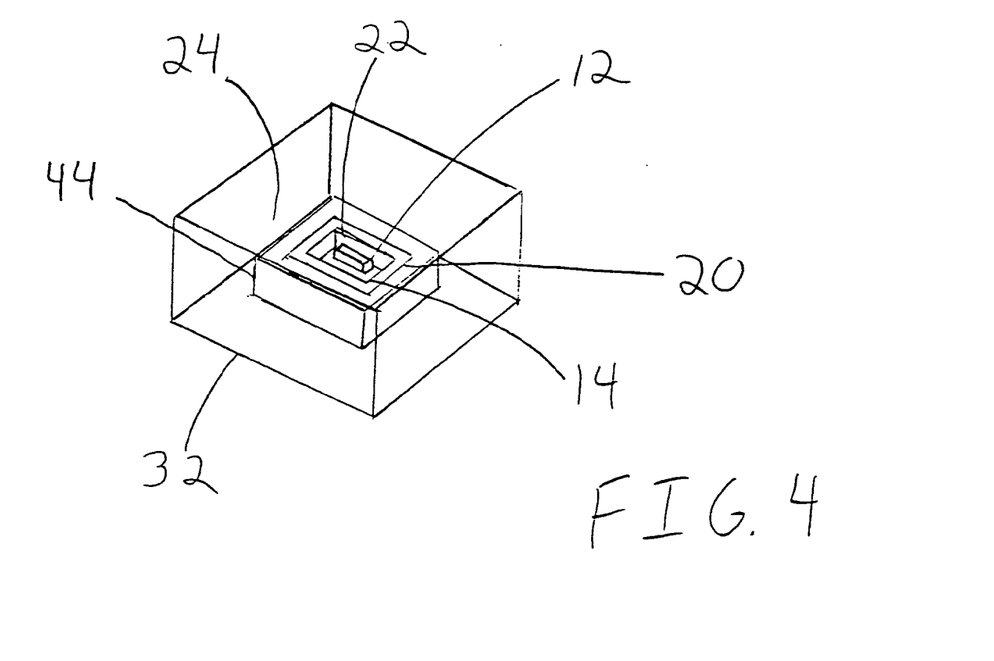

As seen in FIGS. 3 and 4, in a preferred embodiment the holding device 14, also known as a container 14, includes a containment area 22 facing the energy beam generator 16 so that the containment area 22 supports the metal article 12 during operation of the apparatus 10. The holding device 14 includes insulation 44 engaging the holding device 14 to retain the heat in the holding device 14, the fluid material 24, and the metal article 12. Since the insulation 44 engages the holding device 14, the efficiency of the apparatus 10 increases and the metal article 12 can reach higher temperatures, which are conducive to facilitate the metallurgical changes within the metal article 12.

A key aspect of the apparatus 10 is that the combination of the irradiation and the auxiliary heating does not create stresses and strains on the metal article 12. However, the heat and the irradiation facilitate the morphological changes in the metal article 12. It is those morphological changes that harden the metal article 12 and increase the wear characteristics of the metal article 12.

The use of an energy beam 18 to raise the temperature of the metal article 12 to a level required for the facilitation of morphological changes in the metal article 12 is expensive. Also, when the energy beam 18 is used to heat the metal article 12, the energy beam 18 only directly heats the top few millimeters of the material the energy beam 18 strikes. This creates a large temperature gradient across that material. In the prior art, this temperature gradient is in the boron oxide gate.

In the apparatus 10, the use of an auxiliary heating device 20 is designed to alleviate both of these problems with the energy beam 18. The auxiliary heating device 20 can include numerous forms of thermal heating technologies known in the art, including, but not limited to, gas ovens, electric ovens, induction heating, and microwave heating. FIG. 3 shows one embodiment of the auxiliary heating device 20 surrounding the holding device 14.

In one embodiment of the apparatus 10, the operating temperatures of the apparatus 10 range between 450° Celsius(C.) and 1,600° C. Raising the metal article 12 to temperatures in this range is important for the facilitation of the morphological changes in the metal article 12. This temperature level preferably ranges between 1,300° C. and 1,500° C., and most preferably this temperature ranges between 1,350° C. and 1,450° C.

The auxiliary heating device 20 is designed to heat the metal article 12 to at least a 450° C. while the energy beam 18 provides the additional energy required to heat the metal article 12 into the preferred temperature. The auxiliary heating device 20 is designed to heat the metal article 12 to the maximum temperature allowed by the metallurgical characteristics of the metal article 12 and the elemental properties of the fluid material 24.

In a preferred embodiment, the auxiliary heating device 20 heats the metal article 12 to 1,350° C. while the energy beam 18 provides the additional energy required to heat the metal article 12 to the preferred temperature. In this embodiment, the upper limit to which the auxiliary heating device 20 heats the metal article 12 is 1,450° C.

The auxiliary heating device 20 is instrumental in increasing the effectiveness and efficiency of the apparatus 10 by reducing the quantity of irradiation needed to facilitate the metallurgical changes in the metal article 12. Thus, the auxiliary heating device 20 allows the invention to use a much smaller irradiation source and increases the economical savings during the irradiation of the metal article 12.

As seen in FIGS. 3 and 4, the apparatus 10 includes a fluid material 24, is also known as a fluid separator 24, a gate material 24, and a bath material 24, positioned in the containment area 22 of the holding device 14 to separate the metal article 12 in the holding device 14 from the atmosphere (not labeled). The purpose of the fluid material 24 is to separate the metal article 12 from atmospheric conditions. This purpose requires the fluid material 24 to comprise a gaseous or liquid material that can encompass the metal article 12 and keep the atmosphere away from the metal article 12. Oxygen is a key substance in the atmosphere from which the metal article 12 needs to be quarantined in order to reduce uncontrolled combustible reactions during operation of the apparatus 10.

As seen in FIG. 3, the fluid material 24 can be in liquid form. When in liquid form, the fluid material 24 is preferably boron oxide. However, the fluid material 24 can be numerous other liquid materials having a boiling point over 1500° C. and a viscosity enabling the liquid to isolate the metal article 12 from the atmosphere.

As seen in FIG. 4, the fluid separator 24 can also engage the container 14 to separate the container 14 and the metal article 12 from the atmosphere. In this embodiment, the fluid separator 24 is a gaseous substance contained within a sealed area 32 designed to keep the atmospheric gases from away from the metal sample 12. A gaseous fluid separator 24 impedes a smaller amount of irradiation traveling to the metal sample 12 as compared to other types of fluid separators 24. As such, a gaseous fluid separator 24 allows a greater dose of the irradiation to reach the metal sample 12. When in a gaseous form, the fluid separator 24 is preferably argon or nitrogen, but the fluid separator 24 can be other gases that fail to combust at temperatures less than 1500° C.

In alternate embodiments, the fluid material 24 can be selected from numerous liquid or gaseous elements or compounds known in the art to facilitate productive reactions with and in the metal sample 12. For example, the fluid material 24 could be conducive to doping ions onto the metal sample 12. Through the doping of ions from the fluid material 24 to the metal sample 12, the fluid material 24 can alter various properties in the metal sample 12 and foster chemical and metallurgical reactions in the metal sample 12 during the operation of the apparatus 10. Also, the fluid material 24 could be altered to reduce impurities and other forms of elements detrimental to the structure of the metal sample 12. For example, carbon powder could be added to the fluid material 24 to further prevent oxidation within the fluid material 24. Thus, selection of a proper fluid material 24 could increase the beneficial characteristics of the metal sample 12.

In a preferred embodiment, the energy beam 18 is selected from the radiation group consisting of electron beams, x-rays, and gamma rays. It is also known in the radiation industry that these three forms of energy can cause changes in materials. Most importantly, electron beams, x-rays and gamma rays are ionizing radiation, which is a highly energetic form of radiation. Therefore, these three energy forms are able to penetrate the metal sample 12 and cause the morphological changes in the metal sample 12 at a deeper level than other forms of radiation.

Other irradiation techniques known in the industry can supply the irradiation needed to facilitate the morphological changes in the metal sample 12. These include, but are not limited to, ion implantation techniques. Ion implantation techniques are known in the industry to send atoms at high velocities toward a sample of metal sample 12. The atoms smash into the surface of the metal sample 12, thereby creating small structural changes in the surface of the metal sample 12.

As seen in FIG. 1, the apparatus 10 further includes an energy beam delivery instrument 26 positioned between the energy beam generator 16 and the holding device 14 so that the energy beam delivery instrument 26 directs the energy beam 18 to the holding device 14. In a preferred embodiment the energy beam delivery instrument 26 comprises an energy beam transport line 28 and a dispersion device 30.

The dispersion device 30 spreads the energy beam 18 over a predetermined area at a predetermined frequency. The dispersion device 30 regulates the frequency and direction of the energy beam 18 so that the energy beam 18 covers the containment area 22 supporting the metal sample 12. It is known in the industry that a scan horn and scattering plates are types of dispersion devices 30 capable of spreading an energy beam 18 over a predetermined area at a predetermined frequency.

Figure 8:
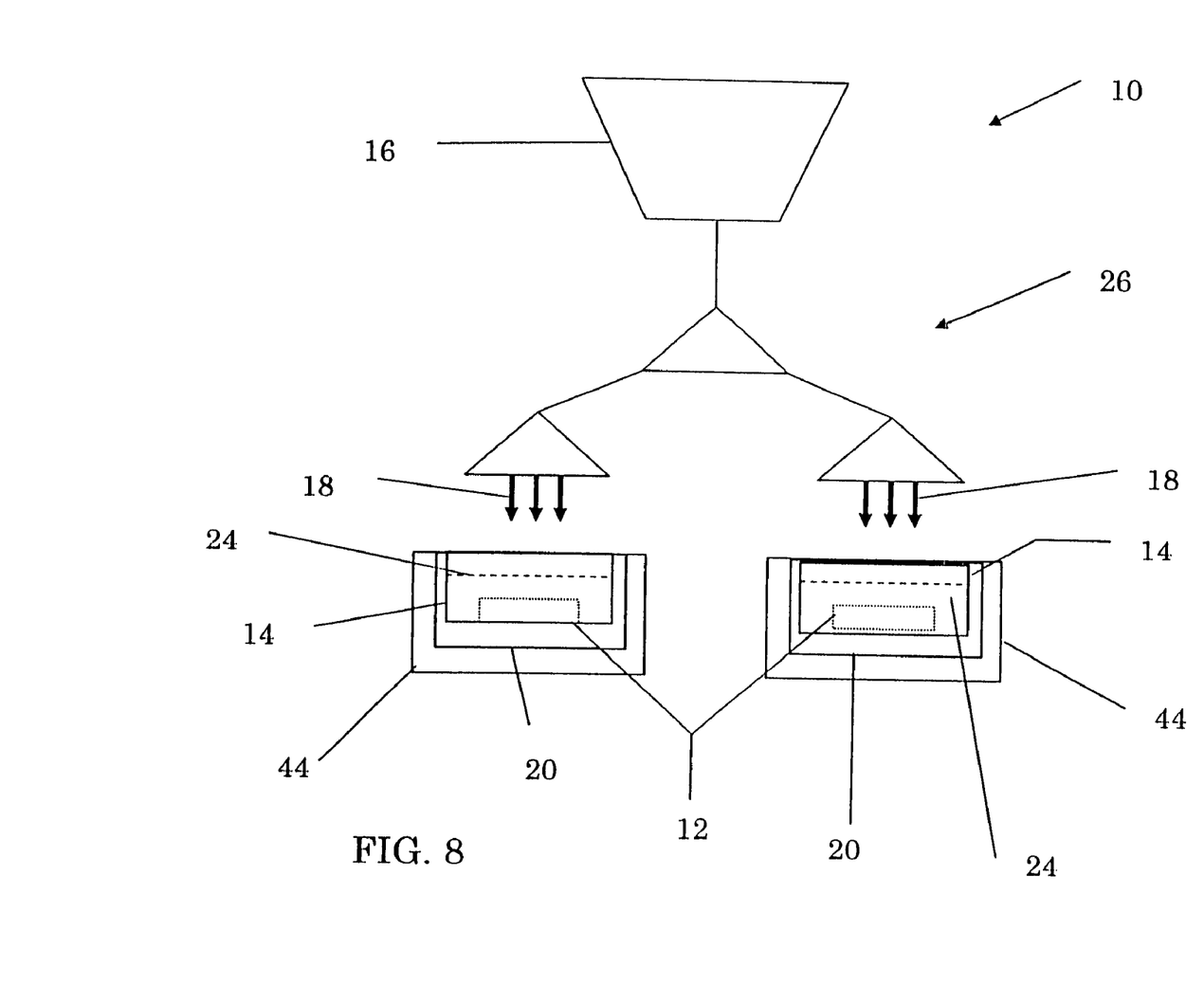
FIG. 8 shows the energy beam delivery instrument varying the energy beam to irradiate multiple metal samples.

The energy beam delivery instrument 26 through the use of a dispersion device 30 can be configured to allow concurrent irradiation of multiple pieces of metal sample 12. This can be accomplished by directing the energy beam 18 to treat two or more metal samples 12 within a single holding device 14, or by distributing the energy beam 18 to engage two or more separate holding devices 14 containing one or more samples of metal sample 12, as seen in FIG. 8. Irradiation of multiple metal samples 12 increases the efficiency of the apparatus 10, thereby making the hardening of metal sample 12 through irradiation more economically viable.

Also the energy beam delivery instrument 26 can vary the engagement location of the energy beam 18 and the metal article 12. This can be accomplished by using the energy beam delivery instrument 26 to direct the energy beam 18 to strike different locations on the metal article 12. This variance allows a more consistent and uniform irradiation of the metal article 12.

Figure 5:
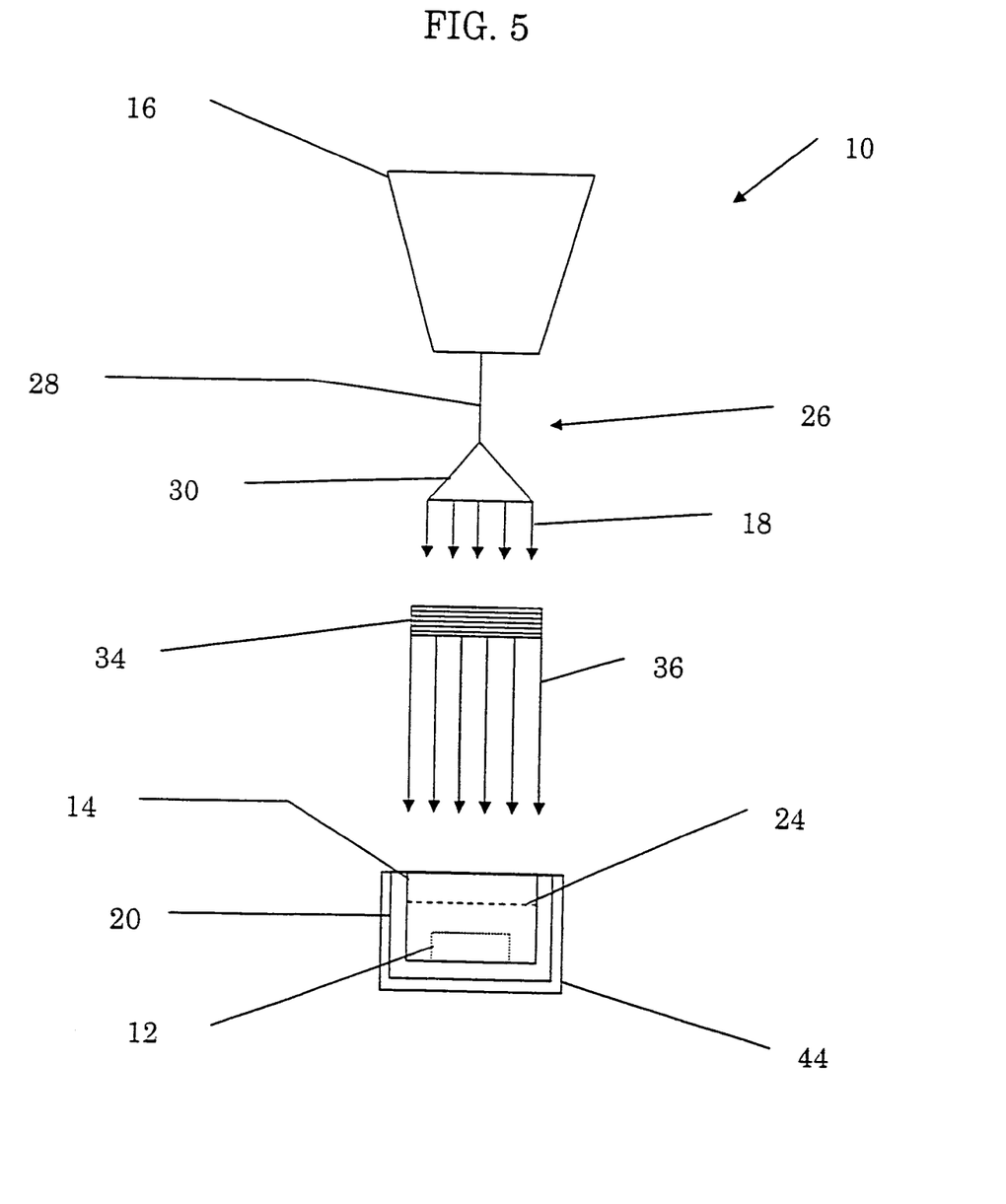
FIG. 5 shows an x-ray converter located between the energy beam generator and the holding device as well as the x-rays directed at the holding device and the metal article.

In a preferred embodiment as seen in FIG. 5, an x-ray converter 34 is positioned between the energy beam generator 16 and the container 14 so that the x-ray converter 34 converts at least 1% of the energy beam 18 into x-rays 36 before the energy beam 18 contacts the metal sample 12. The conversion of the energy beam 18 to x-rays 36 prior to the energy beam 18 engaging the fluid material 24 and the metal sample 12 provides a much higher yield of x-rays 36 engaging the metal sample 12. Also, this conversion provides a defined spectrum of energy engaging the metal sample 12.

Both the increased yield of the x-rays 36 as well as the more defined spectrum of x-ray energy to the metal sample 12 results in a more efficient treatment of the metal sample 12 and a higher uniformity in the quality of metal sample 12 traveled by the irradiation. The use of x-rays 36 also increases the depth of penetration of the irradiation into the metal sample 12, allowing for deeper metallurgical changes that affect the hardening characteristic of the metal sample 12. The x-ray converter 34 is preferably constructed of high atomic numbered materials having sufficient cooling to remove excess heat from the x-ray converter 34. The x-ray converter 34 is designed to filter any low energy x-rays 36 from traveling to the metal sample 12.

Figure 9:
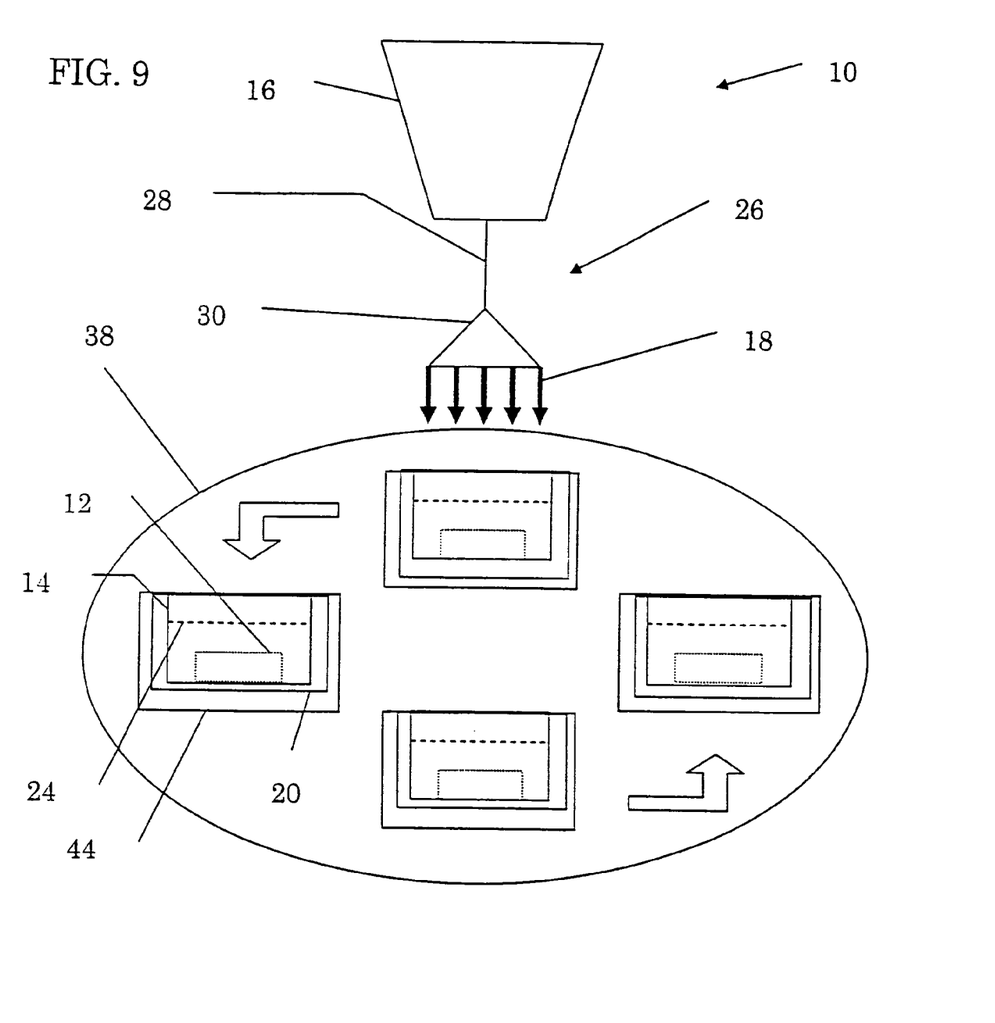
FIG. 9 shows one embodiment of the transport system used to vary the location of the holding device and the metal with respect to the energy beam. This embodiment relocates multiple holding devices to engage the energy beams.
Figure 10A:
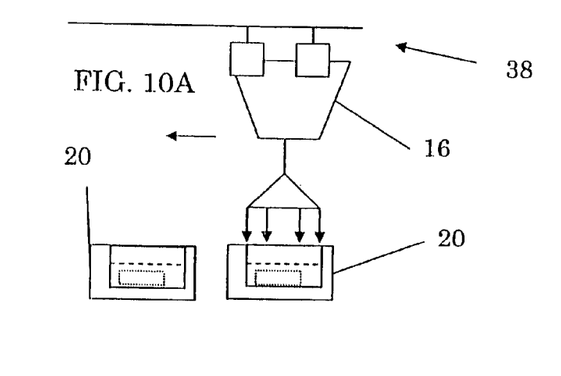
FIG. 10A shows another embodiment of the transport system used to vary the location of the holding device and the metal with respect to the energy beam. This embodiment relocates the energy beam generator so that the energy beam engages multiple metal samples.
Figure 10B:
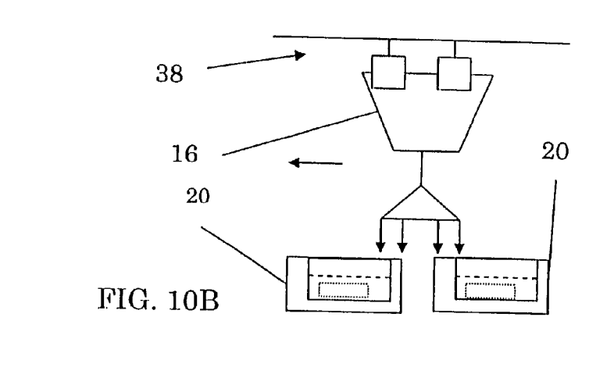
FIG. 10B is similar to FIG. 10A and shows the transport system relocating the energy beam to engage multiple metal samples by moving the energy beam generator from one metal sample to another.
Figure 10C:
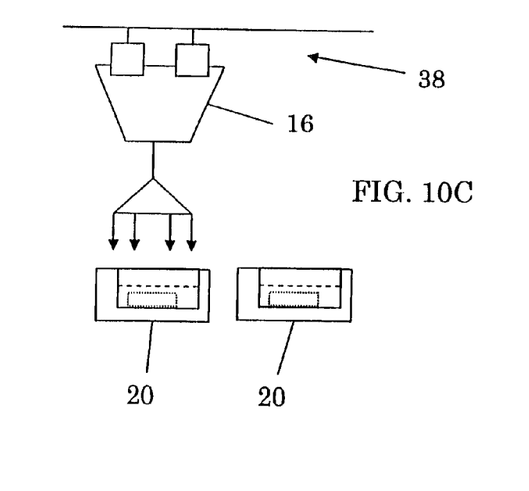
FIG. 10C is similar to FIGS. 10A and 10B and shows the transport system positioning the energy beam generator over an alternate metal sample in order to relocate energy beam to engage multiple metal samples.
Figure 10D:
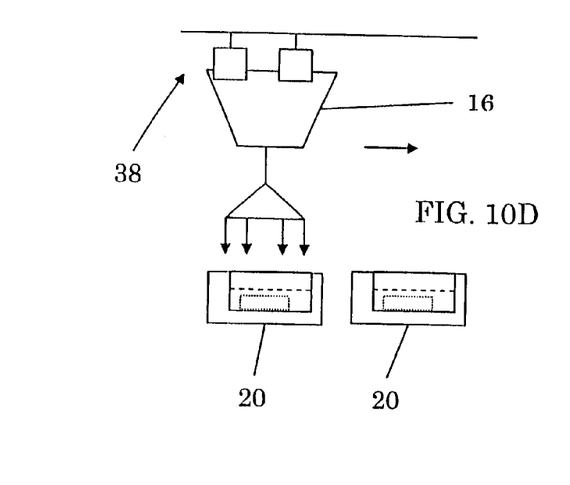
Figure 11A:
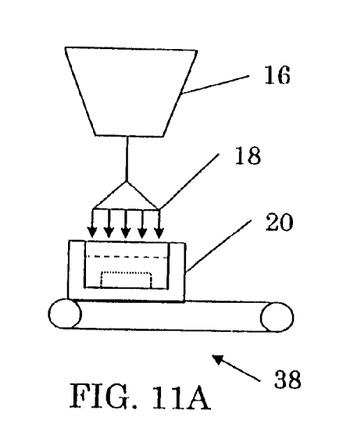
Figure 11B:
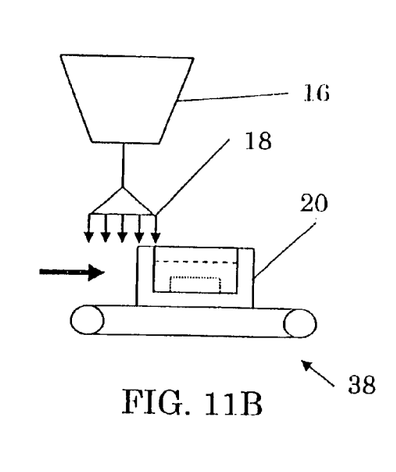
FIG. 11B is similar to FIG. 11A and shows the transport system relocating the holding device so that movement of the holding device will vary the location of a metal sample with respect to the energy beam.
Figure 11C:
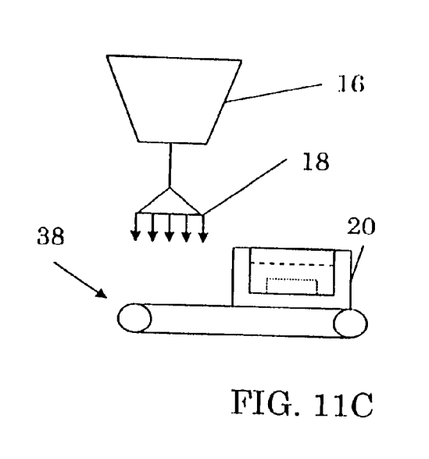
FIG. 11C is similar to FIGS. 11A and 11B and shows the transport system relocating the holding device completely away from the energy beam to vary the location of the metal sample with respect to the energy beam.
Figure 11D:
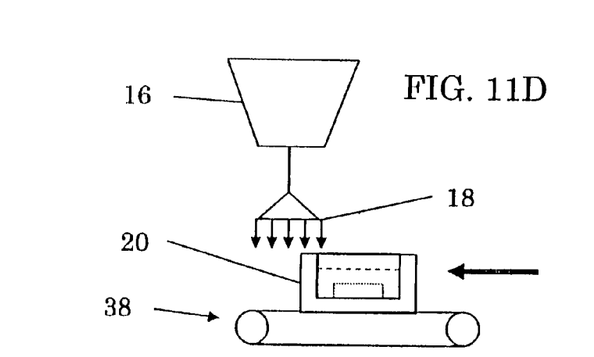
FIG. 11D is similar to FIGS. 11A–C and shows the transport system relocating the holding device toward the energy beam to again engage the metal sample with the energy beam.
Figure 11E:
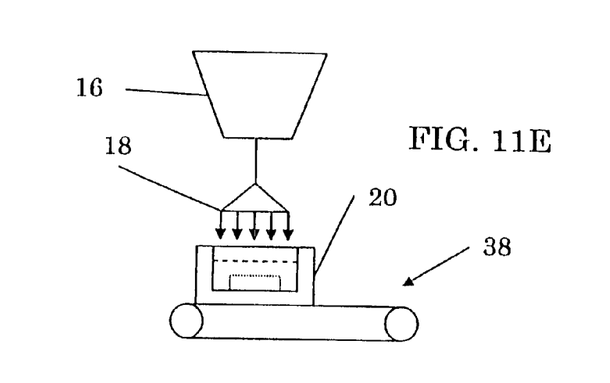
FIG. 11E is similar to FIGS. 11A–D and shows the transport system returning the holding device so that the energy beam fully engages the metal sample.

As schematically illustrated in FIG. 9, the apparatus 10 further comprises a transport system 38, also described as a cycling system 38 and a movement system 38, supporting the holding device 14, wherein the transport system 38 varies the location of the holding device 14 relative to the energy beam generator 16. The transport system 38 can vary the orientation of the holding device 14 with respect to the energy beam 18 and can repeatedly move the holding device 14 in and out of the energy beam 18. It is well know in the art that numerous devices can move items from one location to the next. As such, the transport system 38 can take various forms and can move the holding device 14 or the metal sample 12 in circular, linear, angular or other spatial directions to vary the location of the holding device 14 relative to the energy beam generator 16. For example, the transport system 38 can rotate or tilt the metal sample 12 or the holding device 14 to vary the orientation or location of the metal sample 12 or the holding device 14 relative to the energy beam generator 16.

FIGS. 9–11E, show basic examples of common transport systems 38. For example, FIG. 9 shows an embodiment of the transport system 38 comprising a rotating surface used to vary the location of the holding devices 14 and the metal articles 12 with respect to the energy beam 18. FIGS. 10A–D show another embodiment of the transport systems 38. This embodiment relocates the energy beam generator 16 so that the energy beam 18 engages multiple metal articles 12 during the irradiation. FIGS. 11A–E show an alternate embodiment of the transport system 38 comprising a conveyor belt system to vary the location of the holding device 14 and the metal articles 12 with respect to the energy beam 18. Other transport systems 38 can be selected by one skilled in the art without departure from the inventive spirit disclosed herein.

Movement of the metal article 12 with respect to the energy beam generator 16 allows greater efficiency in developing the morphological changes in the metal article 12. These efficiencies can be increased still if the metal article 12 is heated independently from the energy beam 18 by an auxiliary heating device 20 while the holding device 14 is cycled through the energy beam 18 multiple times. After each irradiation, the metal article 12 can be held at the elevated processing temperature by a combination of an auxiliary heating device 20 and insulation 44. This maintenance of the metal article 12 at the elevated processing temperature allows the morphological changes to proceed outside the radiation environment. Each sample of metal article 12 can then receive another dose of irradiation to increase the morphological changes in the metal article 12.

As seen in FIGS. 9–11E, the usage of the transport system 38, or cycling system 38, to move the holding device 14, or container 14, in relationship to the energy beam 18 also allows the energy beam 18 to irradiate multiple samples of metal article 12. This increases the efficiency of the energy beam generator 16 and the efficiency of the irradiation process, resulting in multiple samples of metal article 12 hardened by the energy beam 18.

Time and temperature are key parameters affecting the morphological changes in metal during the irradiation. Even though irradiation is needed, an irradiation dose coupled with a raised temperature held consistent for a predetermined time should continue to allow the metal article 12 to undergo the morphological changes required to increase the hardening characteristics of the metal article 12. Therefore, varying the location of the metal article 12 with respect to the energy beam 18 should become an important aspect of both the apparatus 10 and the method disclose herein.

For example, if in a preferred embodiment each sample of metal 12 is irradiated for 10–15 seconds of every minute, the auxiliary heating device 20 can maintain the predetermined temperature of the metal sample 12 for the remainder of the minute. During this remaining time, four to five other metal samples 12 could be irradiated. Theses other metal samples 12 could also be maintained at the predetermined temperature during their non-irradiation periods. This would allow the output of a single energy beam generator 16 to increase by five fold.

Figure 12A:
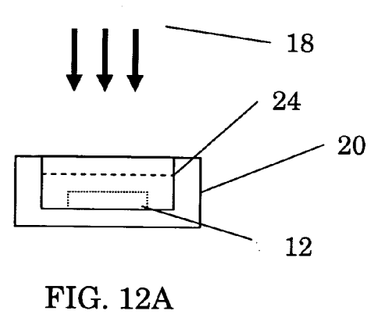
FIG. 12A begins the illustration of varying the orientation of the holding device with respect to the energy beam allowing the energy beam to initially contact different locations on the metal.
Figure 12B:
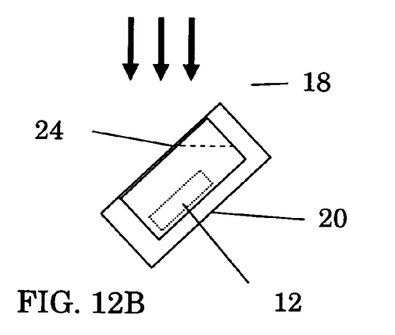
FIG. 12B is similar to FIG. 12A and shows the orientation of the holding device varied, allowing the energy beam to initially contact different locations on the metal.
Figure 12C:
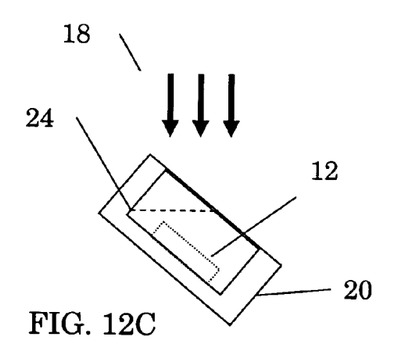
FIG. 12C is similar to FIGS. 12A–B and shows the orientation of the holding device varied in a different orientation than depicted in FIGS. 12A–B, allowing the energy beam to initially contact different locations on the metal.
Figure 12D:
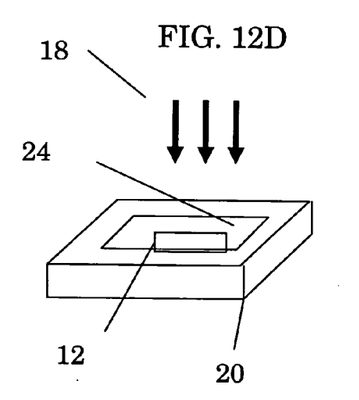
FIG. 12D is similar to FIGS. 12A–C and shows the orientation of the holding device varied in a different orientation than depicted in FIGS. 12A–C, allowing the energy beam to initially contact different locations on the metal.
Figure 12E:
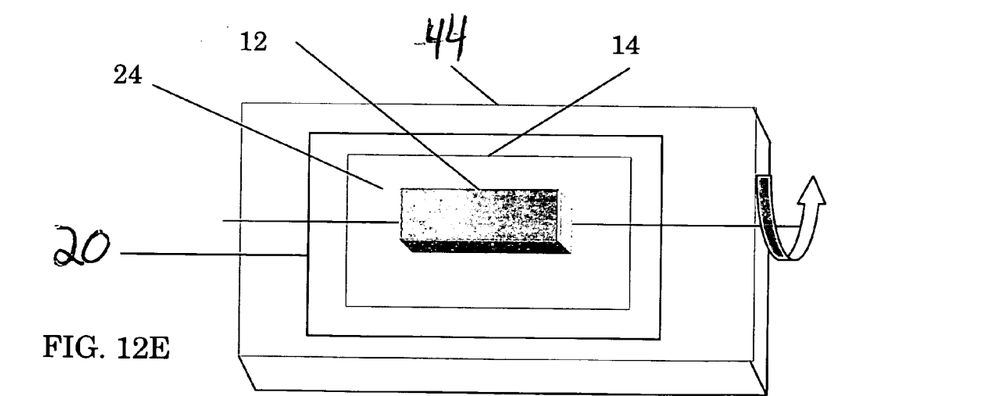
FIG. 12E is similar to FIG. 12A and shows metal sample rotating within the holding device so that the energy beam initially contacts different locations on the metal sample during the rotation of the metal sample.

As seen in FIGS. 12A–12E, the orientation of the metal sample 12 can vary with respect to the energy beam 18. This is most preferably used when energy beam 18 is in the form of an electron beam because the highest energy electrons of the electron beam 18 are stopped in the fluid material 24. Thus, the electrons only penetrate the top of surface of the metal sample 12. When the orientation of the metal sample 12 is varied, the high energy electrons of the electron beam 18 can penetrate the other surfaces of the metal sample 12. As seen in FIGS. 12A–D, the holding device 14 can be tilted it different planes to allow the energy beam to strike difference surfaces. Also, as seen in FIG. 12E, the metal sample 12 can be rotated to allow direct exposure of the energy beam 18 to the different surfaces of the metal sample 12.

In an alternate embodiment, a transport system 38 can move the energy beam generator 16 to irradiate multiple pieces of metal 12, as seen in FIGS. 10A–10D.

Figure 6:
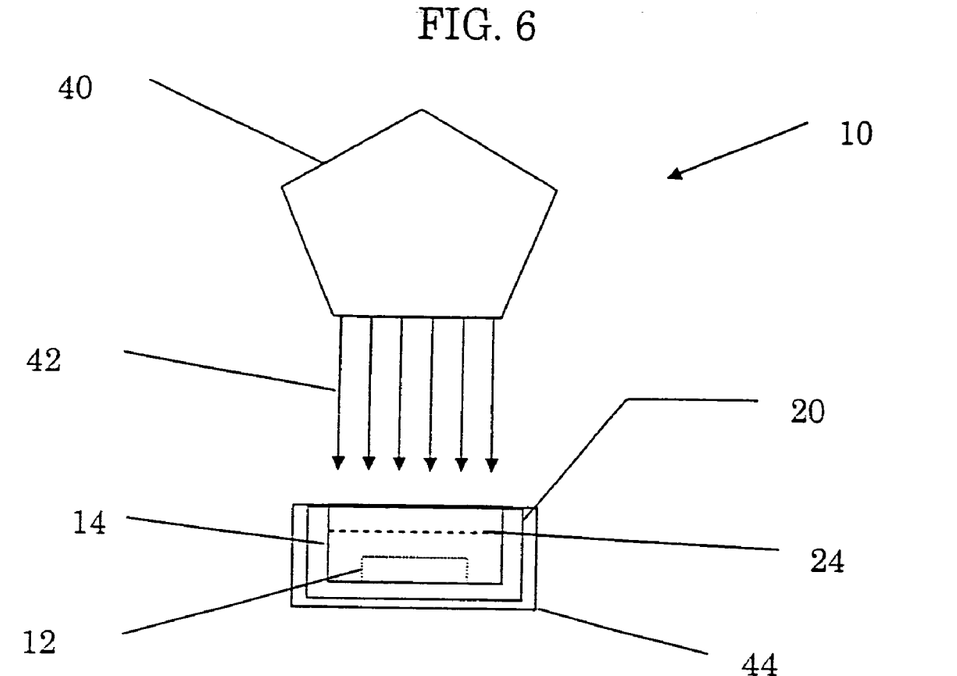
FIG. 6 shows an embodiment of the apparatus utilizing a gamma ray generator pointed at a container holding the metal that is to be hardened.

Referring to FIG. 6, in an alternative embodiment, the apparatus 10 comprises a container 14 for holding the metal sample 12 and a gamma ray source 40 pointing at the container 14, wherein the gamma ray source 40 directs gamma rays 42 at the metal sample 12. This embodiment of the apparatus 10 further includes an auxiliary heating device 20 engaging the container 14, wherein the auxiliary heating device 20 heats the metal sample 12 independently from the gamma rays 42.

The use of gamma rays 42 to irradiate the metal sample 12 provides a form of irradiation that penetrates to a deeper level in the metal sample 12 than possible with lower forms of energy beams 18. It is know in the industry that the gamma rays 42 are produced by decaying materials. Preferably the decaying material (not shown) is cobalt 60, but other decaying materials can be used.

In a preferred embodiment the metal sample 12 comprises tungsten carbide particles held together in a cobalt binder. Other metals could be treated using this apparatus 10 and the method disclosed herein without departure from the spirit of the invention.

A method for hardening metal samples 12 is also disclosed. The method comprises irradiating the metal sample 12 and heating the metal sample 12 independently from the irradiation. In a preferred embodiment, the method further includes heating the metal sample 12 to at least 450° C. prior to irradiating the metal sample 12. Also, this method further includes separating the metal sample 12 from the atmosphere using a fluid material 24.

Figure 13:
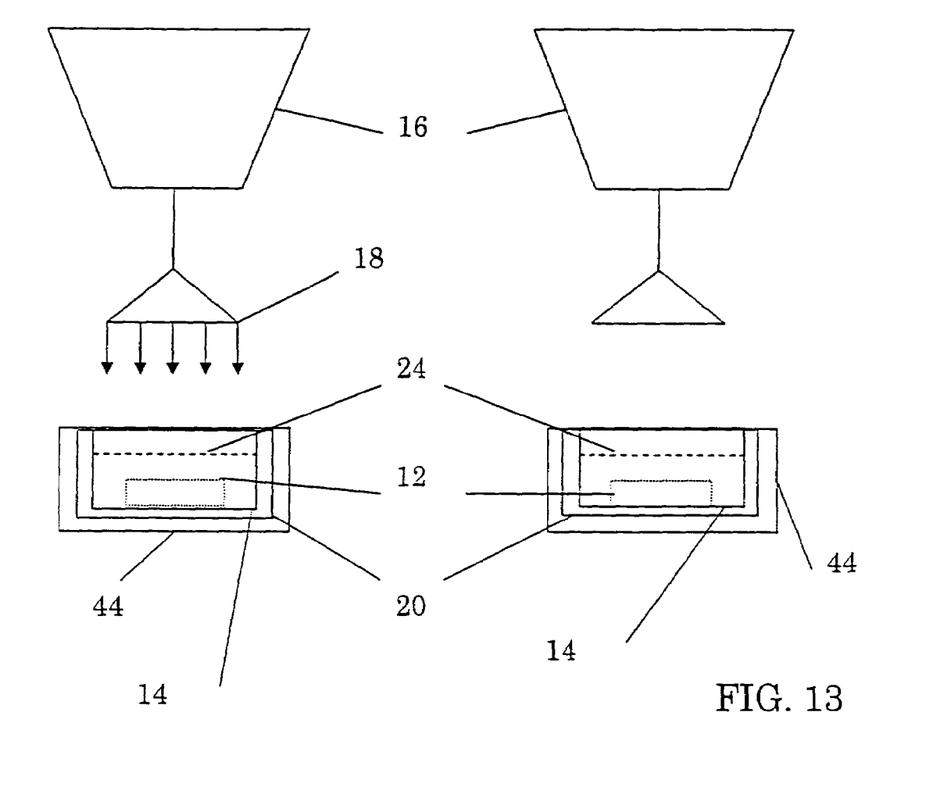
FIG. 13 shows one embodiment of the apparatus intermittently irradiating the metal by controlling the production of energy beams directed at the holding device and the metal.

The method further teaches irradiating the metal sample 12 in intervals. Irradiating the metal sample 12 in intervals includes first heating the metal sample 12 to a predetermined temperature, then irradiating the metal sample 12. Next, discontinuing the irradiation but maintaining the metal sample 12 at the predetermined temperature. Finally, irradiation of the metal sample 12 is continued at a future time. The irradiation of the metal sample 12 in intervals can include repeatedly moving the metal sample 12 in and out of the irradiation, as seen in FIGS. 9–11E, periodically stopping the flow of irradiation, as seen in FIG. 13, and redirecting the irradiation away from the metal sample 12.

The method also teaches varying the engagement location of the irradiation and the metal article 12. This includes altering the orientation of the metal sample 12 with respect to the irradiation as seen in FIGS. 12A–12E. The engagement location of the irradiation and the metal article 12 can be altered by numerous techniques, including, but not limited too, rotating, tilting, or linearly repositioning the metal article 12, rotating, tilting, or linearly repositioning the holding device 14, or redirecting the irradiation to engage a different portion of the metal article 12.

To increase the efficiency of the irradiation process, the method further includes concurrently irradiating multiple pieces of metal 12. This includes moving multiple pieces of metal 12 in and out of the path of irradiation as seen in FIGS. 9–11E. Concurrently irradiating multiple pieces of metal 12 can also include directing the irradiation to engage two or more pieces of metal 12 during substantially the same time period, as seen in FIG. 8.

Figure 7:
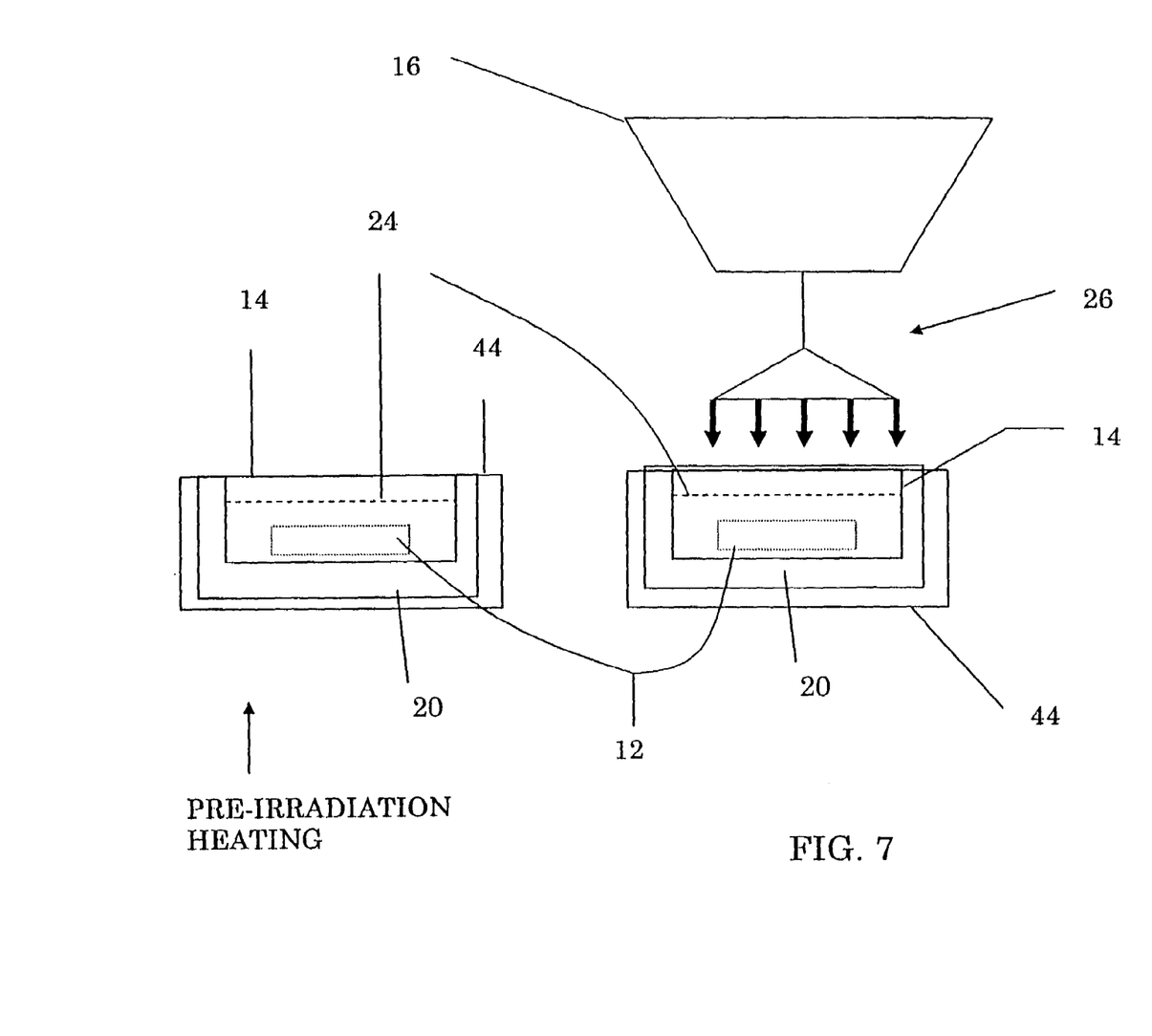
FIG. 7 shows pre-irradiation heating of the metal sample to increase the production of the hardened metal.

Also, the method teaches irradiating by converting at least 1% of an energy beam 18 into x-rays 36 before the energy beam 18 reaches the metal sample 12. As seen in FIG. 7, the method also teaches heating the metal sample 12 to at least 450° C. prior to irradiating the metal sample 12.

The method teaches repetitively varying the amount of irradiation engaging the metal article 12. The metal sample 12 can be transport through the irradiation, moved in and out of the irradiation, or irradiated in intervals.

In the method, the metal sample 12 is irradiated with irradiation from the group consisting of electron beams, x-rays and gamma rays. As previously mentioned, this group is selected because all three forms of energy are ionizing radiation and are highly penetrating forms of radiation.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. An apparatus for hardening a metal article, comprising:
a holding device for supporting the metal article;
an energy beam generator pointed at the holding device, wherein the energy beam generator directs an energy beam at the metal article to harden the metal article; and
a cycling system supporting the holding device, wherein the cycling system varies the location of the holding device relative to the energy beam generator, the cycling system repeatedly engages the energy beam with the metal article and the cycling system repeatedly moves the holding device in and out of the energy beam.

2. An apparatus for hardening a metal article, comprising:
a holding device for supporting the metal article;
an energy beam generator pointed at the holding device, wherein the energy beam generator directs an energy beam at the metal article to harden the metal article;
a cycling system supporting the holding device, wherein the cycling system varies the location of the holding device relative to the energy beam generator, the cycling system repeatedly engages the energy beam with the metal article; and
a fluid material engaging the holding device to separate the metal article from the atmosphere.

3. The apparatus of claim 2, wherein the energy beam is selected from the group consisting of electron beams, x-rays, and gamma rays.

4. An apparatus for hardening a metal article, comprising:
a holding device for supporting the metal article;
an energy beam generator pointed at the holding device, wherein the energy beam generator directs an energy beam at the metal article to harden the metal article;
a cycling system supporting the holding device, wherein the cycling system varies the location of the holding device relative to the energy beam generator, the cycling system repeatedly engages the energy beam with the metal article; and
wherein the holding device further includes a containment area facing the energy beam generator so that the containment area supports the metal article.

5. An apparatus for hardening a metal article, comprising:
a holding device for supporting the metal article, the holding device including insulation operatively engaging the holding device to retain heat transferred to the holding device;
an energy beam generator pointed at the holding device, wherein the energy beam generator directs an energy beam at the metal article to harden the metal article; and
a cycling system supporting the holding device, wherein the cycling system varies the location of the holding device relative to the energy beam generator, the cycling system repeatedly engages the energy beam with the metal article.

6. An apparatus for hardening a metal article, comprising:
a holding device for supporting the metal article;
an energy beam generator pointed at the holding device, wherein the energy beam generator directs an energy beam at the metal article to harden the metal article;
a cycling system supporting the holding device, wherein the cycling system varies the location of the holding device relative to the energy beam generator, the cycling system repeatedly engages the energy beam with the metal article; and
an auxiliary heating device engaging the holding device, wherein the auxiliary heating device heats the metal article independently from the energy beam.

7. The apparatus of claim 6, wherein the auxiliary heating device heats the metal article to at least 450° C.

8. The apparatus of claim 2, further including an energy beam delivery instrument positioned between the energy beam generator and the holding device to direct the energy beam to the holding device.

9. An apparatus for hardening a metal article, comprising:
a holding device for supporting the metal article;
an energy beam generator pointed at the holding device, wherein the energy beam generator directs an energy beam at the metal article to harden the metal article;
a cycling system supporting the holding device, wherein the cycling system varies the location of the holding device relative to the energy beam generator, the cycling system repeatedly engages the energy beam with the metal article; and
wherein the energy beam generator is a gamma-ray source and the energy beam is a gamma ray.

10. An apparatus for hardening a metal article to increase the wear characteristics of the metal article, comprising:
a container for holding the metal article;
an energy beam generator pointed at the container, wherein the energy beam generator directs an energy beam at the metal article to increase the wear characteristics of the metal article;
a transport system supporting the container, wherein the transport system varies the location of the container relative to the energy beam generator and the transport system cycles the metal article in the energy beam; and
an energy beam delivery instrument positioned between the energy beam generator and the container so that the energy beam delivery instrument varies the amount of the energy beam reaching the container.

11. The apparatus of claim 10, further including an x-ray converter positioned between the energy beam generator and the container so that the x-ray converter converts at least 1% of the energy beam into x-rays before the energy beam contacts the metal article.

12. The apparatus of claim 10, wherein the transport system repeatedly moves the container in and out of the energy beam.

13. The apparatus of claim 10, further including an auxiliary heating device engaging the container, wherein the auxiliary heating device heats the metal article independently from the energy beam.

14. The apparatus of claim 13, wherein the auxiliary heating device heats the metal article to at least 450° C.

15. The apparatus of claim 10, further including a fluid separator engaging the container to separate the metal article from the atmosphere.

16. The apparatus of claim 10, wherein the container further includes insulation operatively engaging the container to retain heat transferred to the container.

17. The apparatus of claim 10, wherein the energy beam is selected from the group consisting of electron beams, x-rays, and gamma rays.

18. The apparatus of claim 10, wherein the energy beam delivery instrument intermittently directs the energy beam at the container.

19. The apparatus of claim 10, wherein the energy beam delivery instrument directs the energy beam at multiple containers.

20. A method for hardening a metal article, comprising:
a) irradiating the metal article;
b) heating the metal article independently from the irradiation; and
c) repetitively varying the amount of irradiation engaging the metal article.

21. The method of claim 20, wherein step b) further includes separating the metal article from the atmosphere using a fluid material.

22. The method of claim 20, wherein step a) further includes irradiating with radiation from the group consisting of electron beams, x-rays, and gamma rays.

23. The method of claim 20, wherein step a) further includes irradiating by converting at least 1% of an energy beam to x-rays before the energy beam reaches the metal article.

24. The method of claim 20, wherein step a) further includes irradiating the metal article in intervals.

25. The method of claim 20, wherein step a) further includes concurrently irradiating multiple metal articles.

26. The method of claim 20, wherein step c) further includes repeatedly moving the metal article in and out of the irradiation.

27. The method of claim 20, wherein step c) further includes transporting the metal article through the irradiation.

28. The method of claim 20, wherein step c) further includes irradiating the metal article in intervals.

29. The method of claim 20, wherein step b) further includes heating the metal article to at least 450° C. prior to performing step a).

30. The method of claim 20, wherein step c) further includes varying the location of the metal article relative to the irradiation.

* * * * *